(12) United States Patent
Itoh

(10) Patent No.: US 8,432,615 B2
(45) Date of Patent: Apr. 30, 2013

(54) IMAGE TAKING APPARATUS

(75) Inventor: Yoshinori Itoh, Shimotsuke (JP)

(73) Assignee: Canon Kabushiki Kaisha (JP)

(*) Notice: Subject to any disclaimer, the term of this patent is extended or adjusted under 35 U.S.C. 154(b) by 18 days.

(21) Appl. No.: 13/278,275

(22) Filed: Oct. 21, 2011

(65) Prior Publication Data

US 2012/0113528 A1    May 10, 2012

(30) Foreign Application Priority Data

Nov. 10, 2010   (JP) ................. 2010-251845

(51) Int. Cl.
*G02B 15/14*    (2006.01)
(52) U.S. Cl.
USPC ....................................................... 359/682
(58) Field of Classification Search ........... 359/680–682
See application file for complete search history.

(56) References Cited

U.S. PATENT DOCUMENTS

| 7,023,623 | B2 | 4/2006 | Miyatake et al. |
| 7,092,170 | B2 | 8/2006 | Satori |
| 8,218,242 | B2 * | 7/2012 | Mitsuki .......................... 359/682 |
| 8,218,243 | B2 * | 7/2012 | Saruwatari .................... 359/682 |

FOREIGN PATENT DOCUMENTS

JP    2006-208890 A    8/2006

* cited by examiner

*Primary Examiner* — Scott J Sugarman
(74) *Attorney, Agent, or Firm* — Rossi, Kimms & McDowell LLP

(57) ABSTRACT

An image taking apparatus including a zoom lens; and a solid-state image pickup element, wherein the zoom lens includes, a first lens unit; a second lens unit; and a third lens unit, the first lens unit, the second lens unit and the third lens unit moving during zooming, wherein the first lens unit includes a lens 1*a*; and a lens 1*b*, wherein the second lens unit includes a lens 2*a*; a cemented lens wherein a lens 2*b* and a lens 2*c* are cemented; and a lens 2*d*, and wherein a curvature radius R2*cr* of an image-side lens surface of the lens 2*c*, a refractive index n2*c* of a material of the lens 2*c*, a focal length ft of an entire system at a telephoto end, an F-number Fnow at a wide-angle end, and a half angle of field ωW at the wide-angle end are appropriately set.

3 Claims, 7 Drawing Sheets

IMAGE TAKING APPARATUS

BACKGROUND OF THE INVENTION

1. Field of the Invention

The present invention relates to an image taking apparatus suitable for, for example, a digital still camera, a video camera, a TV camera and a monitoring camera.

2. Description of the Related Art

As an image taking optical system to be used in an image taking apparatus, a compact high-performance zoom lens which is short in total lens length, and has a wide angle of field is required. As a zoom lens which is compact in its entirety and has a wide angle of field, there is known a negative-lead type zoom lens in which a lens unit having a negative refractive power is disposed on the most object side.

As the negative-lead type zoom lens, there is known a three-lens-unit zoom lens including, in order from the object side to the image side, a first lens unit having a negative refractive power, a second lens unit having a positive refractive power and a third lens unit having a positive refractive power. For example, there is known a compact zoom lens having a wide angle of field, in which the first lens unit includes a negative lens and a positive lens, the second lens unit includes a positive lens, a cemented lens in which a positive lens and a negative lens are cemented and a positive lens, and the third lens unit includes a positive lens. (U.S. Pat. Nos. 7,092,170, 7,023,623, and Japanese Patent Application Laid-Open No. 2006-208890)

For the purpose of downsizing the zoom lens, there is known a retractable type in which, when the zoom lens is not in use (at the time of non-image taking), the intervals among the respective lens units are reduced to be different from the intervals used in an image taking state so as to reduce the amount of lens protrusion from the image taking apparatus. In general, as the number of lenses of each lens unit constituting the zoom lens becomes larger, the length of each lens unit along the optical axis becomes longer. In addition, as the amount of movement of each lens unit at the time of zooming and focusing becomes larger, the total lens length becomes longer. As a result, the length of a retractable lens in retracted state becomes long, and thus it is difficult to downsize the image taking apparatus.

In order to obtain a zoom lens which is compact in its entirety and short in length of the retractable lens in retracted state, and which has a wide angle of field and a high zoom ratio, it is necessary to appropriately set the movement condition of each lens unit, which depends on the zoom type and zooming, the refractive power of each lens unit and the lens structure of each lens unit. For example, when the zoom lens is desired to be downsized, this is achieved by strengthening the refractive power of each lens unit and reducing the movement amount of each lens unit during zooming.

However, simply strengthening the refractive power of each lens unit causes larger aberration fluctuations due to zooming, and those are difficult to be corrected satisfactorily. When the above-mentioned three-lens-unit zoom lens is desired to be made compact in its entirety and to widen angle of field, it is important to appropriately set the structure of each lens of the second lens unit serving as a main magnification-varying lens unit. If the lens structure of the second lens unit is set inappropriately, it becomes difficult to obtain a wide angle of field and high optical performance over the entire zoom range while achieving the downsizing of the entire system.

SUMMARY OF THE INVENTION

The present invention has an object to provide an image taking apparatus including a zoom lens, in which the entire lens system is compact, a wide angle of field and a high zoom ratio are achieved, and high optical performance is obtained over the entire zoom range.

An image taking apparatus according to the present invention includes; a zoom lens, and a solid-state image pickup element for picking up an image formed by the zoom lens, in which the zoom lens includes, in order from an object side to an image side; a first lens unit having a negative refractive power, a second lens unit having a positive refractive power, and a third lens unit having a positive refractive power, the first lens unit, the second lens unit and the third lens unit moving so as to change intervals among the first lens unit, the second lens unit and the third lens unit during zooming, in which the first lens unit includes, in order from the object side to the image side; a lens $1a$ having a negative power, and a lens $1b$ having a positive power, in which the second lens unit includes, in order from the object side to the image side; a lens $2a$ having a positive power, a cemented lens in which a lens $2b$ having a positive power and a lens $2c$ having a negative power are cemented, and a lens $2d$ having a positive power, and in which the following conditional expressions are satisfied:

$$4.0 < (n2c \times ft)/(R2cr \times Fnow) < 6.0; \text{ and}$$

$$71 < n2c \times \omega W < 97,$$

where $R2cr$ denotes a curvature radius of an image-side lens surface of the lens $2c$, $n2c$ denotes a refractive index of a material of the lens $2c$, $ft$ denotes a focal length of an entire system at a telephoto end, $Fnow$ denotes an F-number at a wide-angle end, and $\omega W$ (degrees) denotes a half angle of field at the wide-angle end.

Further features of the present invention will become apparent from the following description of exemplary embodiments with reference to the attached drawings.

DESCRIPTION OF THE EMBODIMENTS

A zoom lens of the present invention which is used in an image taking apparatus including a solid-state image pickup element includes, in order from an object side to an image side, a first lens unit having a negative refractive power, a second lens unit having a positive refractive power and a third lens unit having a positive refractive power. During zooming, the first to third lens units move so as to change intervals among the respective lens units. Specifically, during zooming from a wide-angle end to a telephoto end, the first lens unit moves along a locus convex to the image side, the second lens unit moves monotonously to the object side, and the third lens unit moves to the image side.

Figure 1A:
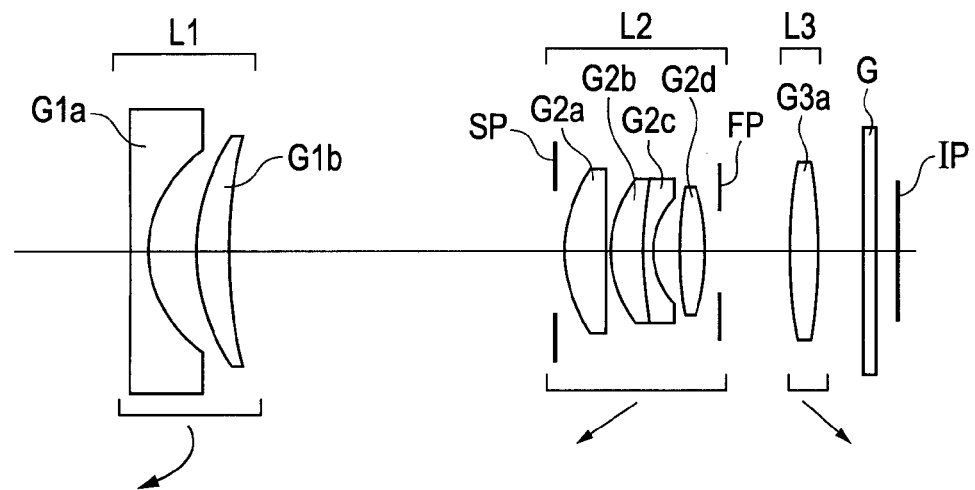
FIG. 1A is a lens cross-sectional view at a wide-angle end of a zoom lens according to a first embodiment of the present invention.
Figure 1B:
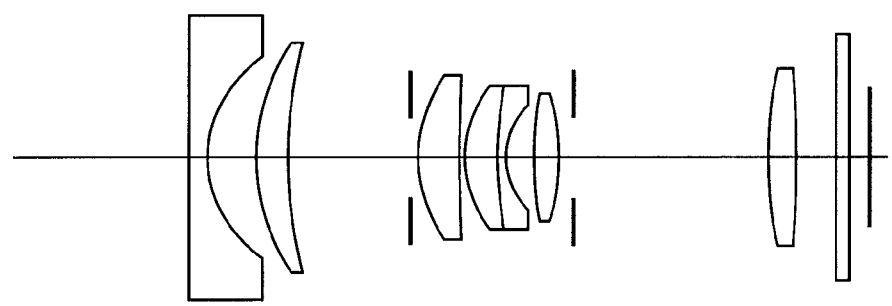
FIG. 1B is a lens cross-sectional view at an intermediate zoom position of the zoom lens according to the first embodiment of the present invention.
Figure 1C:
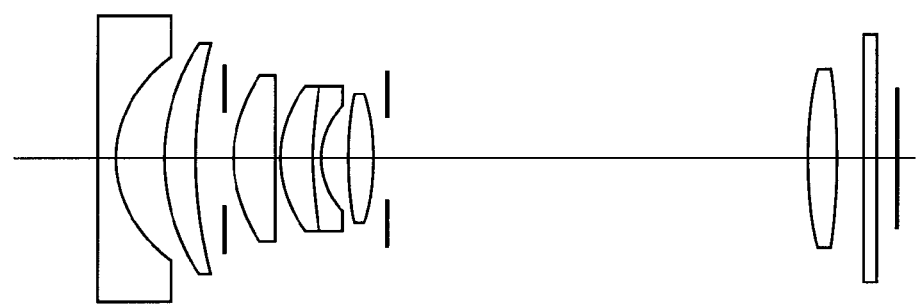
FIG. 1C is a lens cross-sectional view at a telephoto end of the zoom lens according to the first embodiment of the present invention.
Figure 2A:
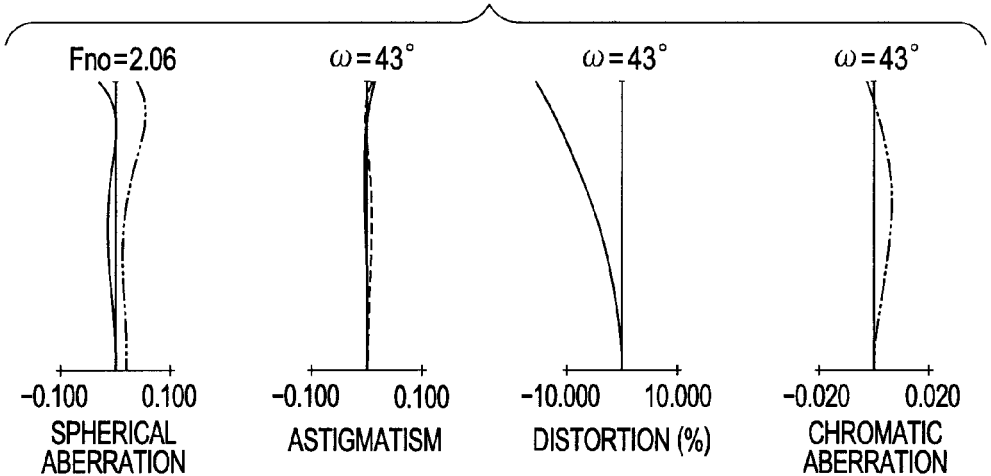
FIG. 2A is an aberration graph at the wide-angle end of the zoom lens according to the first embodiment of the present invention.
Figure 2B:
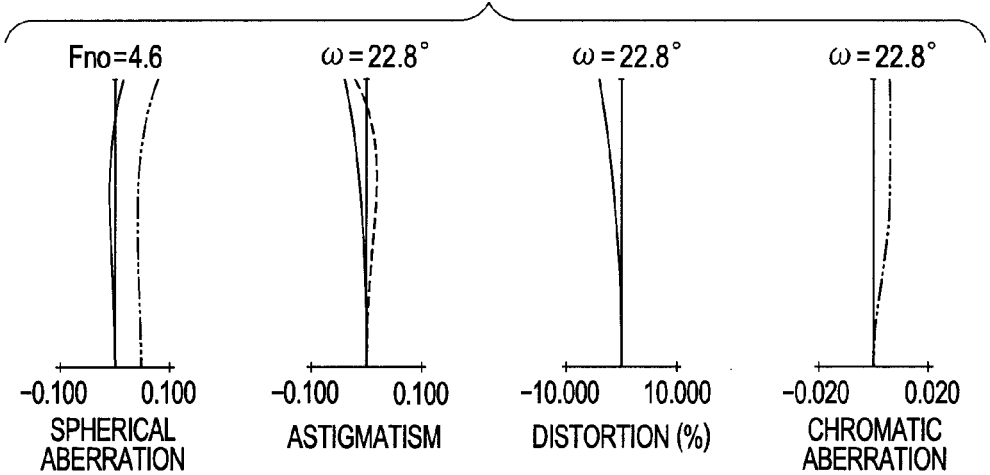
FIG. 2B is an aberration graph at the intermediate zoom position of the zoom lens according to the first embodiment of the present invention.
Figure 2C:
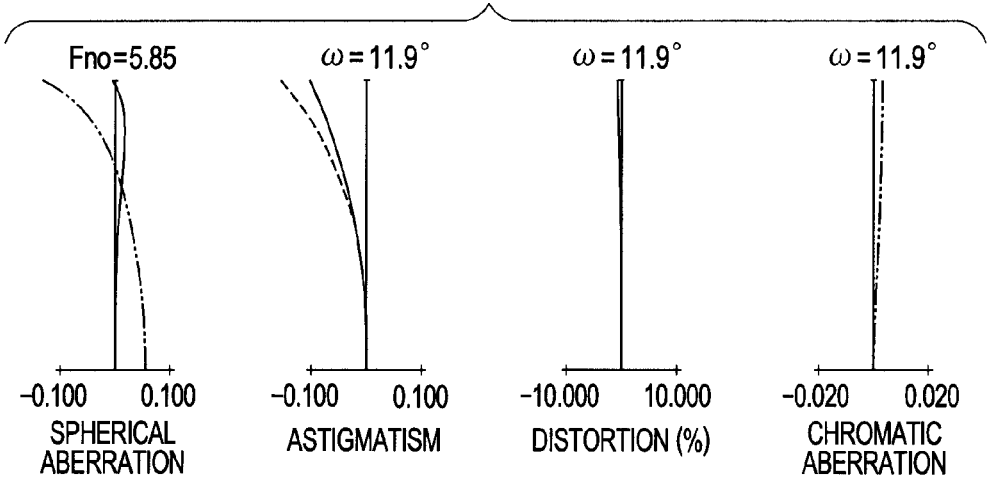
FIG. 2C is an aberration graph at the telephoto end of the zoom lens according to the first embodiment of the present invention.
Figure 3A:
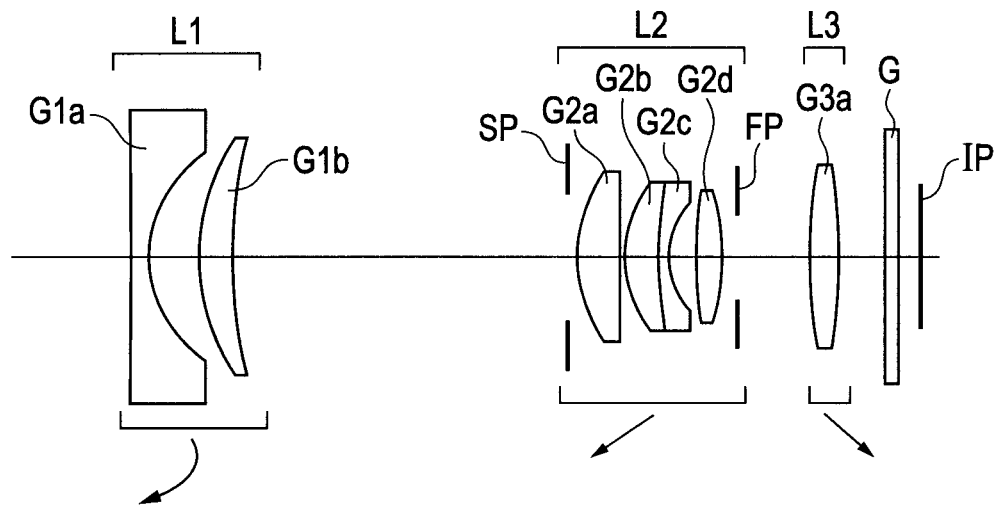
FIG. 3A is a lens cross-sectional view at the wide-angle end of a zoom lens according to a second embodiment of the present invention.
Figure 3B:
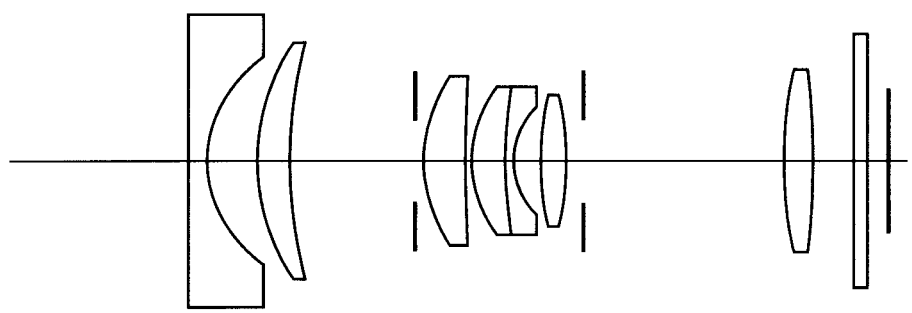
FIG. 3B is a lens cross-sectional view at the intermediate zoom position of the zoom lens according to the second embodiment of the present invention.
Figure 3C:
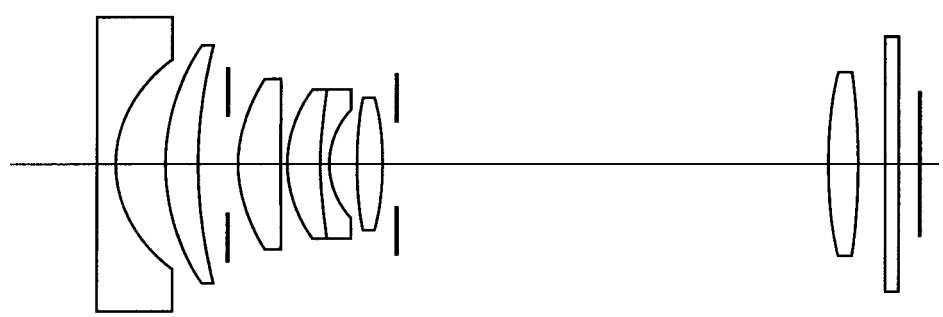
FIG. 3C is a lens cross-sectional view at the telephoto end of the zoom lens according to the second embodiment of the present invention.
Figure 4A:
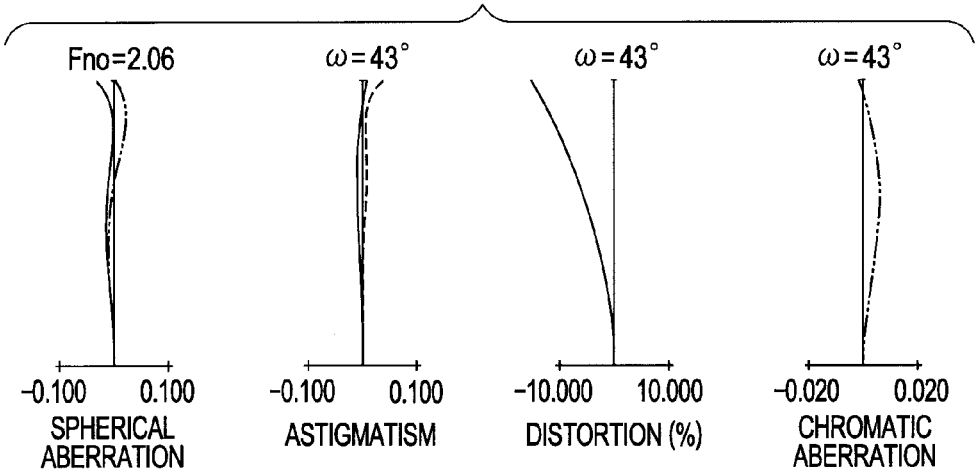
FIG. 4A is an aberration graph at the wide-angle end of the zoom lens according to the second embodiment of the present invention.
Figure 4B:
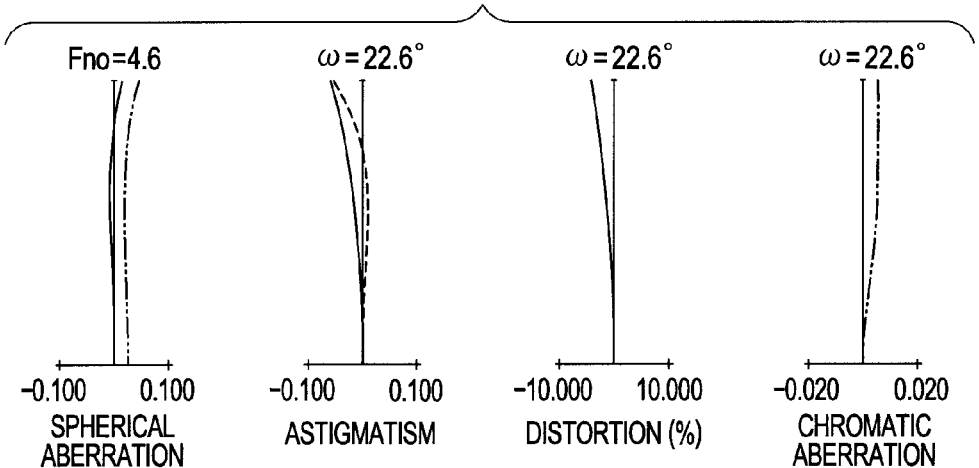
FIG. 4B is an aberration graph at the intermediate zoom position of the zoom lens according to the second embodiment of the present invention.
Figure 4C:
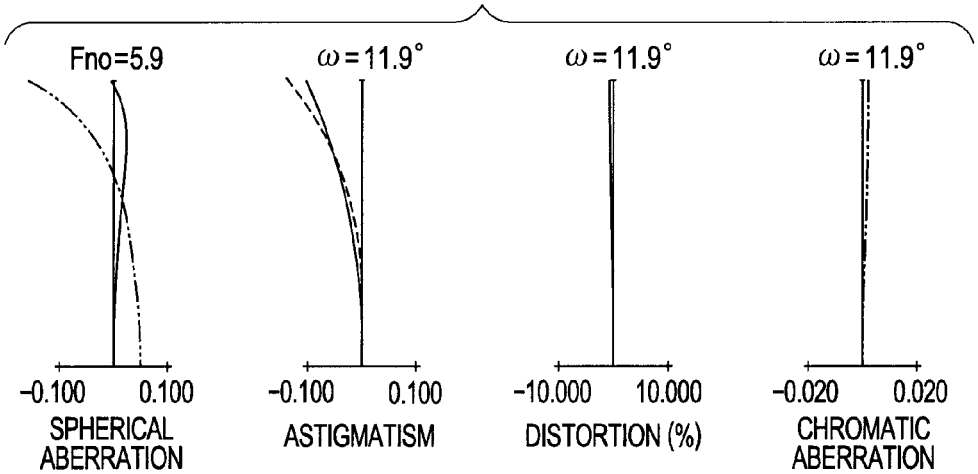
FIG. 4C is an aberration graph at the telephoto end of the zoom lens according to the second embodiment of the present invention.
Figure 5A:
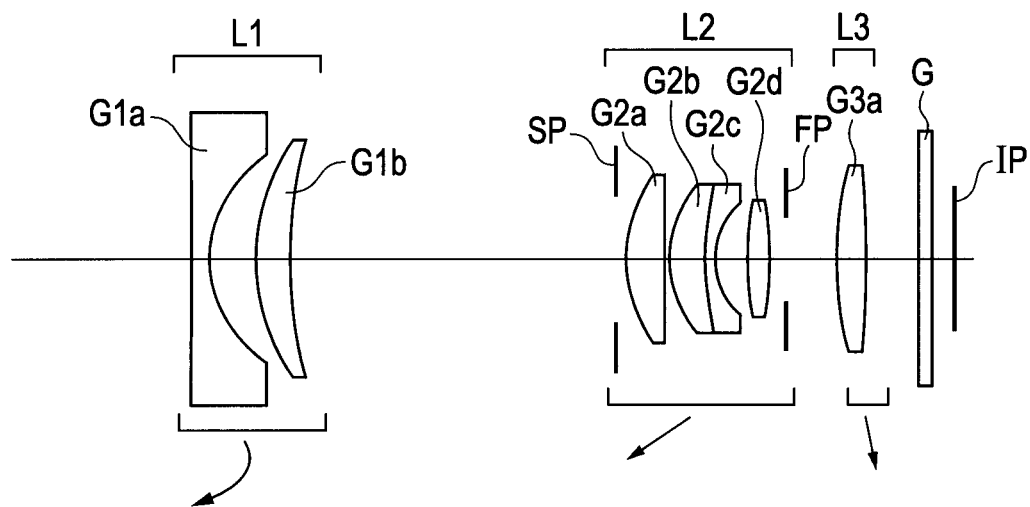
FIG. 5A is a lens cross-sectional view at the wide-angle end of a zoom lens according to a third embodiment of the present invention.
Figure 5B:
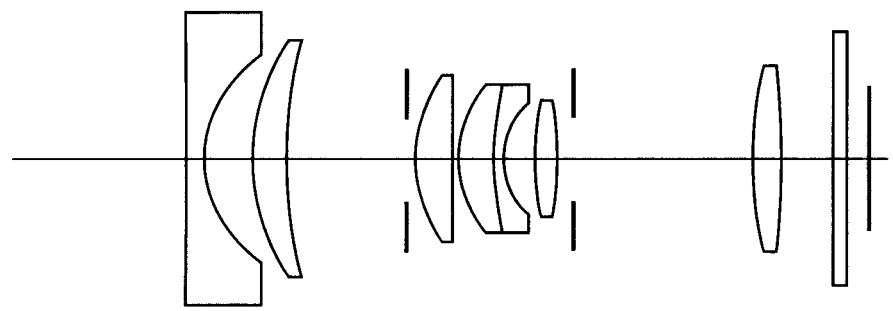
FIG. 5B is a lens cross-sectional view at the intermediate zoom position of the zoom lens according to the third embodiment of the present invention.
Figure 5C:
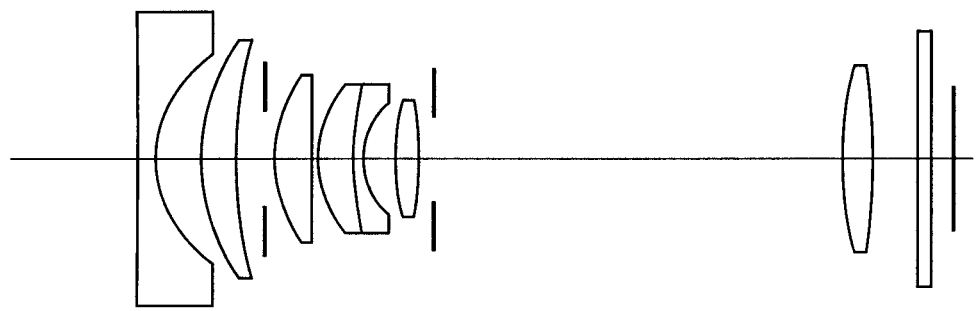
FIG. 5C is a lens cross-sectional view at the telephoto end of the zoom lens according to the third embodiment of the present invention.
Figure 6A:
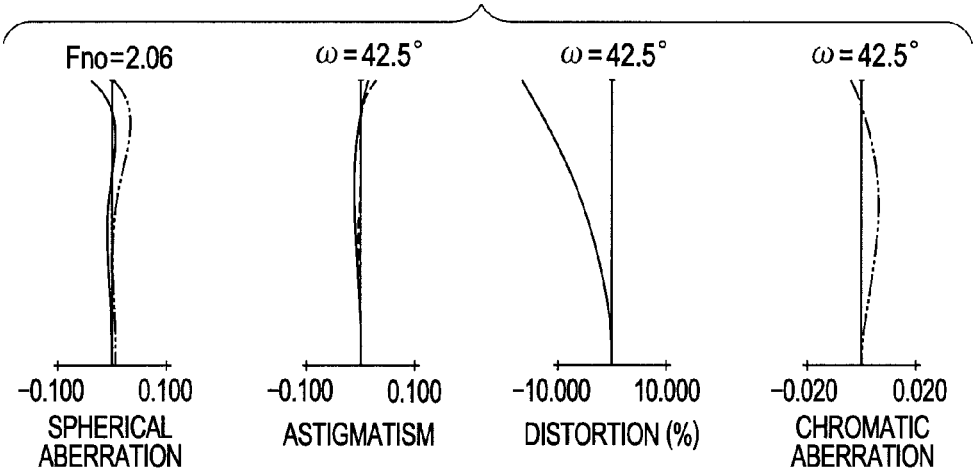
FIG. 6A is an aberration graph at the wide-angle end of the zoom lens according to the third embodiment of the present invention.
Figure 6B:
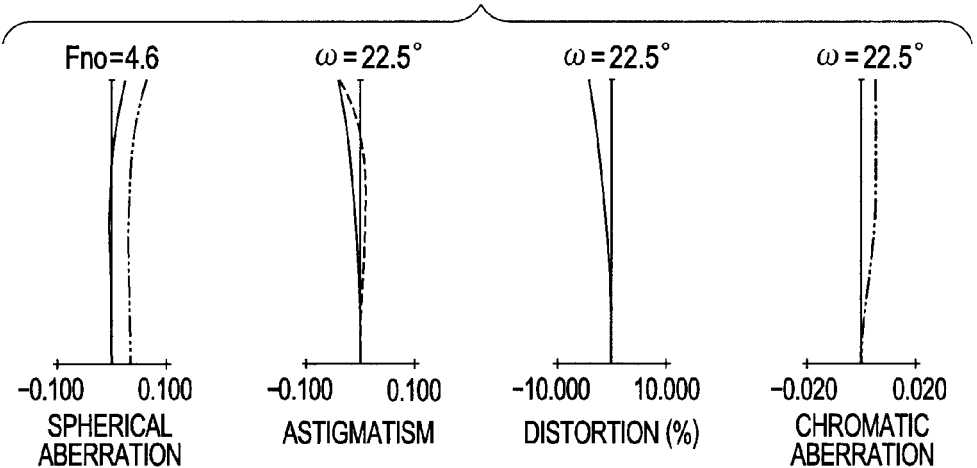
FIG. 6B is an aberration graph at the intermediate zoom position of the zoom lens according to the third embodiment of the present invention.
Figure 6C:
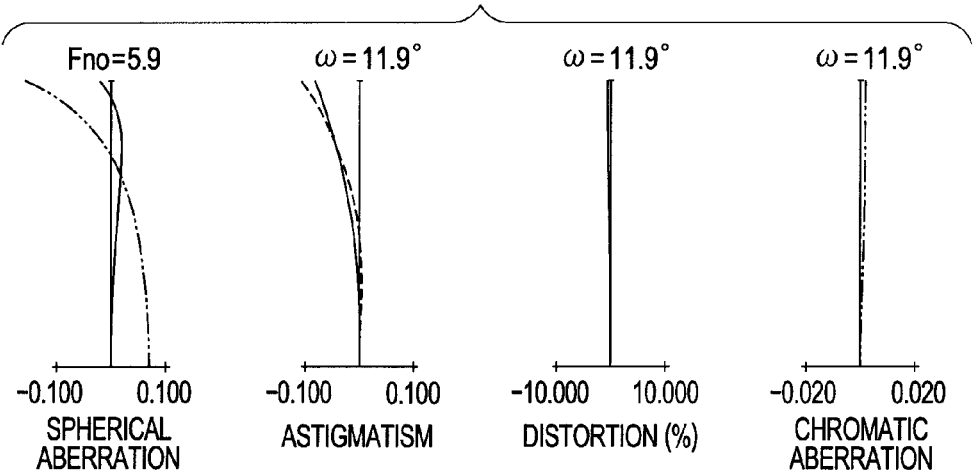
FIG. 6C is an aberration graph at the telephoto end of the zoom lens according to the third embodiment of the present invention.
Figure 7:
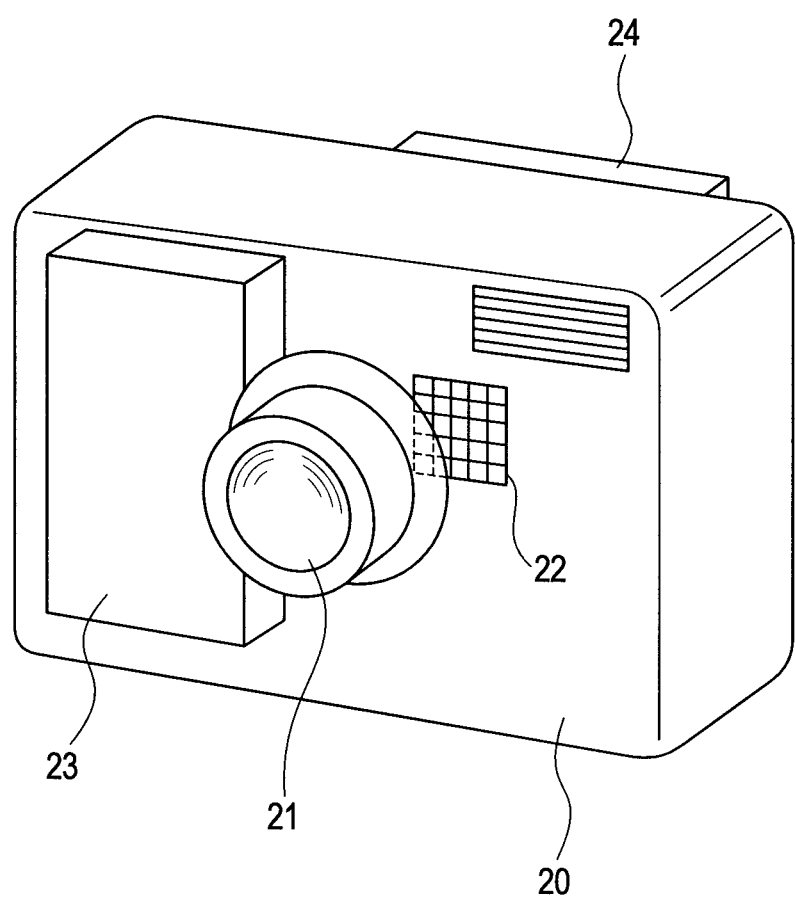
FIG. 7 is a schematic diagram of a main part of an image taking apparatus according to the present invention.

In the zoom lens of the present invention, a lens unit having a refractive power may be disposed on the object side of the first lens unit or on the image side of the third lens unit. FIGS. 1A, 1B and 1C are lens cross-sectional views at a wide-angle end (short focal length end), at an intermediate zoom position and at a telephoto end (long focal length end), respectively, of a zoom lens used in an image taking apparatus according to a first embodiment of the present invention. FIGS. 2A, 2B and 2C are aberration graphs at the wide-angle end, at the intermediate zoom position and at the telephoto end, respectively, of the zoom lens used in the image taking apparatus according to the first embodiment of the present invention. The zoom lens of the first embodiment has a zoom ratio of 4.22 and an aperture ratio of from 2.06 to 5.85. FIGS. 3A, 3B and 3C are lens cross-sectional views at the wide-angle end, at the intermediate zoom position and at the telephoto end, respectively, of a zoom lens used in an image taking apparatus according to a second embodiment of the present invention. FIGS. 4A, 4B and 4C are aberration graphs at the wide-angle end, at the intermediate zoom position and at the telephoto end, respectively, of the zoom lens used in the image taking apparatus according to the second embodiment of the present invention. The zoom lens of the second embodiment has a zoom ratio of 4.22 and an aperture ratio of from 2.06 to 5.90. FIGS. 5A, 5B and 5C are lens cross-sectional views at the wide-angle end, at the intermediate zoom position and at the telephoto end, respectively, of a zoom lens used in an image taking apparatus according to a third embodiment of the present invention. FIGS. 6A, 6B, and 6C are aberration graphs at the wide-angle end, at the intermediate zoom position and at the telephoto end, respectively, of the zoom lens used in the image taking apparatus according to the third embodiment of the present invention. The zoom lens of the third embodiment has a zoom ratio of 4.18 and an aperture ratio of from 2.06 to 5.90. FIG. 7 is a schematic diagram of a main part of a digital still camera (image taking apparatus) including the zoom lens of the present invention. In the lens cross-sectional views, the left-hand side corresponds to the object side (front side), and the right-hand side corresponds to the image side (rear side).

In the lens cross-sectional views, the zoom lens of each embodiment includes a first lens unit L1 having a negative refractive power (optical power=reciprocal of focal length), a second lens unit L2 having a positive refractive power and a third lens unit L3 having a positive refractive power. An F number determining member (hereinafter, also referred to as "aperture stop") SP has a function of an aperture stop that determines (restricts) an open F number (Fno) beam. A flare cut stop FP has a constant aperture diameter. An optical block G is an optical filter, a face plate, a quartz low-pass filter, an infrared cut filter, or the like. As an image plane IP, an imaging plane of a solid-state image pickup element (photoelectric transducer) such as a CCD sensor or a CMOS sensor is disposed when the zoom lens is used as an image taking optical system of a video camera or a digital still camera.

Among the aberration graphs, a spherical aberration graph is illustrated by a d-line, which is indicated by the solid line, and a g-line, which is indicated by the long dashed double-short dashed line. The F number is denoted by Fno. In an astigmatism graph, a meridional image plane and a sagittal image plane are indicated by the dashed line and the solid line, respectively. Lateral chromatic aberration is indicated by the g-line. A half angle of field is denoted by $\omega$. Note that, the wide-angle end and the telephoto end in each embodiment described below mean zoom positions obtained when a magnification-varying lens unit (second lens unit L2) is positioned at each end of the mechanically movable range on the optical axis. In each lens cross-sectional view, the arrow indicates a moving locus of each lens unit during zooming from the wide-angle end to the telephoto end.

In the zoom lens of each embodiment, during zooming from the wide-angle end to a zoom position at the telephoto end, the first lens unit L1 moves along a part of locus convex toward the image side, in a substantially reciprocating manner so as to correct image plane variation due to magnification-varying. The second lens unit L2 moves to the object side monotonously so as to perform main magnification-varying. The third lens unit L3 moves to the image side. In this case, during zooming from the wide-angle end to the telephoto end, each lens unit moves so that the interval between the first lens unit L1 and the second lens unit L2 decreases while the interval between the second lens unit L2 and the third lens unit L3 increases (changes).

The third lens unit is moved to the object side so as to perform focusing from an infinite object to a close object. The F number determining member SP is disposed on the object side of the second lens unit L2 and the flare cut stop FP is disposed on the image side of the second lens unit L2, and both the F number determining member SP and the flare cut stop FP move together with the second lens unit L2 during zooming. The second lens unit L2 is moved in such a manner as to have a component in a direction perpendicular to the optical axis, thereby causing an image to be moved in the direction perpendicular to the optical axis. In other words, the second lens unit L2 performs image stabilization.

Hereinafter, features of the lens structure of the zoom lens of each embodiment are described. In general, when a zoom lens which is compact in its entirety and has a wide field of angle is structured, if the selected type is a negative-lead type in which a lens unit having a negative refractive power is provided at the front of the system, the rear principal point can be positioned closer to the image side, with the result that a long back focal distance can be easily obtained. Then, in order to realize a zoom lens having an excellent telecentric characteristic on the image side, it is desired that the lens unit closest to the image pickup element (image plane) be a lens unit having a positive refractive power and serve as a field lens.

The zoom lens of each embodiment includes at least three lens units of, in order from the object side to the image side, the first lens unit L1 having a negative refractive power, the second lens unit L2 having a positive refractive power and the third lens unit L3 having a positive refractive power. Each lens unit moves during zooming. Then, in order to realize excellent optical performance in the entire zoom range in addition to achieving a wide angle of field, compactness for the entire system and a high zoom ratio, the following structure is employed.

The first lens unit L1 includes a lens 1a having a negative power and a lens 1b having a positive power in order from the object side to the image side. The second lens unit L2 includes, in order from the object side to the image side, a lens 2a having a positive power, a cemented lens in which a lens 2b having a positive power and a lens 2c having a negative power are cemented and a lens 2d having a positive power. The curvature radius of the image-side lens surface of the lens 2c is denoted by R2cr, and the refractive index of a material of the lens 2c is denoted by n2c. The focal length of the entire system at the telephoto end is denoted by ft, and the F-number and the half angle of field at the wide-angle end are denoted by Fnow and ωW (degrees), respectively.

Then, the following conditional expressions are satisfied.

$$4.0 < (n2c \times ft)/(R2cr \times Fnow) < 6.0 \quad (1)$$

$$71 < n2c \times \omega W < 97 \quad (2)$$

In the above-mentioned three-lens-unit zoom lens, the first lens unit L1 includes two lenses, and the second lens unit L2 includes four lenses. If a bright F-number is desired while achieving a wide angle of field (for example, the angle of field is 80 degrees or larger at the wide-angle end), coma aberration and field curvature increase in peripheral parts of an image plane over a wide-angle-of-field range, and it is difficult to correct those aberrations favorably.

In view of the above, in each embodiment, the lens structure of the second lens unit L2 is provided as described above. In particular, in order to satisfy the conditional expression (2), the lens 2c uses a material having a high refractive index, and also, the curvature of the lens surface is appropriately set so as to satisfy the conditional expression (1). With this, a coma flare occurring in an area from the central part of the image plane to the peripheral part of the image plane can be favorably corrected in the wide-angle-of-field range. The conditional expression (1) is for obtaining favorable optical performance while widening angle of field. Further, the conditional expression (2) is for obtaining a favorable image while widening angle of field when the zoom lens according to the present invention is used in the image taking apparatus.

The conditional expression (1) is obtained by normalizing the product of the refractive index of the material of the lens 2c and the focal length of the entire system at the telephoto end by the product of the curvature radius of the image-side lens surface of the lens 2c and the F-number Fno of the entire system at the wide-angle end. If the value of the conditional expression (1) is equal to or greater than the upper limit with the refractive index of the material of the lens 2c being too high or with the curvature radius of the image-side lens surface of the lens 2c being too small, the manufacturing becomes unfavorably difficult, and also, it becomes unfavorably difficult to correct the field curvature in the wide-angle-of-field range. If the value of the conditional expression (1) is equal to or smaller than the lower limit with the refractive index of the material of the lens 2c being too low or with the image-side curvature radius of the lens 2c being too large, it becomes unfavorably difficult to correct the coma flare occurring in the peripheral part of the image plane in the wide-angle-of-field range.

The conditional expression (2) relates to the product of the refractive index of the material of the lens 2c and the half angle of field (degrees) at the wide-angle end, and is a condition which is to be satisfied along with the conditional expression (1). If the value of the conditional expression (2) is equal to or greater than the upper limit with the refractive index of the material of the lens 2c being too high, the manufacturing becomes unfavorably difficult, and also, it becomes unfavorably difficult to correct the field curvature in the wide-angle-of-field range. If the value of the conditional expression (2) is equal to or smaller than the lower limit with the refractive index of the material of the lens 2c being too low or with the half angle of field being too small, it becomes difficult to correct the coma flare in the wide-angle-of-field range, and also, it becomes difficult to widen angle of field. More favorably, the numerical ranges of the conditional expressions (1) and (2) are set as follows.

$$4.1 < (n2c \times ft)/(R2cr \times Fnow) < 4.8 \quad (1a)$$

$$80 < n2c \times \omega W < 90 \quad (2a)$$

In each embodiment, by appropriately setting the material and the shape of the lens of the second lens unit L2 in this manner, even if the first lens unit L1 is structured by two lenses, favorable aberration correction can be performed easily, and the coma aberration in the peripheral part of the image plane and the field curvature are thus favorably corrected in the wide-angle-of-field range.

In each embodiment, more favorably, the four lenses constituting the second lens unit L2 are structured as follows. The third lens unit L3 includes a lens 3a having a positive power. The focal lengths of the lens 2c and the lens 2d are denoted by f2c and f2d, respectively. The focal length of the entire system at the wide-angle end is denoted by fw. The focal length of the second lens unit L2 is denoted by f2. Then, favorably, at least one of the following conditional expressions is satisfied.

$$-0.5 < f2c/f2d < -0.3 \quad (3)$$

$$-3 < (n2c \times f2c)/fw < -2 \quad (4)$$

$$2.5 < (n2c \times f2)/(R2cr \times Fnow) < 2.8 \quad (5)$$

The focal lengths of the lens 2b and the lens 2c constituting the cemented lens of the second lens unit L2 vary depending on respective Abbe numbers υd of materials used therefor. In this case, in order to reduce optical performance deterioration of the cemented lens due to the decentering between lens elements of the cemented lens, which is caused in cementing the lens elements during manufacturing, it is desired that the focal length of the lens 2c be set to an appropriate value. Under those conditions, it is desired that materials which enable favorable correction of chromatic aberration be selected. On the other hand, the lens 2d, which is on the most image side among the lenses constituting the second lens unit L2, corrects the coma flare occurring in the area from the central part of the image plane to the peripheral part of the image plane in a range from the wide-angle end to the intermediate zoom position. The conditional expression (3) is for reducing the coma flare in this case.

The conditional expression (4) is for favorably correcting the coma flare occurring in the area from the central part of the image plane to the peripheral part of the image plane in the wide-angle-of-field range, by using a material having a high refractive index for the lens 2c, and appropriately setting the curvature of the lens surface. The conditional expression (5) is for appropriately setting the structure of the second lens unit L2 in order to achieve a large-diameter lens in the wide-angle-of-field range.

The conditional expression (3) relates to the ratio between the focal lengths of the lens 2c and the lens 2d. If the value of the conditional expression (3) is equal to or greater the upper limit with the power of the lens 2d being too weak, it becomes difficult to correct fluctuations in field curvature in an intermediate zoom range. If the value of the conditional expression (3) is equal to or smaller than the lower limit with the power of the lens 2d being too strong, it becomes unfavorably difficult to correct the coma flare occurring in the central part of the image plane in the wide-angle-of-field range.

The conditional expression (4) is obtained by normalizing the product of the refractive index of the material of the lens 2c and the focal length of the lens 2c by the focal length of the entire system at the wide-angle end. If the value of the conditional expression (4) is equal to or greater than the upper limit with the power of the lens 2c being too strong, it becomes unfavorably difficult to correct axial chromatic aberration in the wide-angle-of-field range. If the value of the conditional expression (4) is equal to or smaller than the lower limit with the power of the lens 2c being too weak, it becomes difficult to perform correction because a flare caused by an upper beam increases in the range from the wide-angle end to the intermediate zoom position.

The conditional expression (5) is obtained by normalizing the product of the refractive index of the material of the lens 2c and the focal length of the second lens unit L2 by the product of the curvature radius of the image-side lens surface of the lens 2c and the F-number (Fno) at the wide-angle end. If the value of the conditional expression (5) is equal to or greater than the upper limit with the refractive index of the material of the lens 2c being too high or with the curvature radius of the image-side lens surface of the lens 2c being too small, the manufacturing becomes difficult, and also, it becomes unfavorably difficult to correct the field curvature in the wide-angle-of-field range.

If the value of the conditional expression (5) is equal to or smaller than the lower limit with the refractive index of the material of the lens 2c being too low or with the curvature radius of the image-side lens surface of the lens 2c being too large, it becomes unfavorably difficult to correct the coma flare occurring in the peripheral part of the image plane in the wide-angle-of-field range. In each embodiment, more favorably, the numerical ranges of the conditional expressions (3) to (5) are set as follows.

$$-0.40 < f2c/f2d < -0.32 \quad (3a)$$

$$-2.8 < (n2c \times f2c)/fw < -2.3 \quad (4a)$$

$$2.60 < (n2c \times f2)/(R2cr \times Fnow) < 2.75 \quad (5a)$$

In each embodiment, it is desired that both lens surfaces of the lens 1a having a negative power have an aspherical shape, that the object-side lens surface of the lens 2a have an aspherical shape, and that one of the lens surfaces of the lens 2d have an aspherical shape. With this structure, high optical performance can be obtained easily over the entire zoom range while reducing aberration fluctuations during of zooming.

As described above, according to each embodiment, by appropriately setting the lens structure of each lens unit, the materials of the lenses of the second lens unit, and the like, favorable optical performance is obtained while shortening the total lens length with a small number of lenses. Further, high optical performance is obtained over the entire zoom range while an ultra wide angle of field of 40° or wider is achieved as the half angle of field at the wide-angle end, and a large-diameter lens having the F-number of approximately F2.0 is achieved. Further, by shortening the total length, the zoom lens is made compact when retracted. In addition, there is provided an image taking apparatus excellent in portability, in which the total lens length is successfully shortened when the zoom lens is retracted.

Hereinafter, the lens structure of each embodiment is described. In each embodiment, the first lens unit L1 having a negative refractive power includes two lenses of, in order from the object side to the image side, a negative lens G1a having a biconcave shape and a positive lens G1b having a meniscus shape in which the surface on the object side is convex. In the first lens unit L1, various off-axial aberrations, in particular, astigmatism and distortion, tend to occur because the amount of refraction of an off-axial beam is large at the wide-angle end. To address this, in each embodiment, by using the negative lens G1a and the positive lens G1b, the effective diameter of the lens on the most object side is prevented from being increased. The first lens unit L1 has two component lenses, both of which are formed of a glass material having a high refractive index. As a result, the curvature of each lens surface is made smaller, and the field curvature is suppressed.

Then, a low-dispersion glass material is used for the material of the negative lens G1a, and a high-dispersion glass material is used for the material of the positive lens G1b. As a result, the axial chromatic aberration and lateral chromatic aberration are favorably corrected at the telephoto end and at the wide-angle end, respectively. Further, the negative lens G1a having a biconcave shape is structured to have both surfaces on the object side and the image side have an aspherical shape in which a negative refractive power is decreased from the center of the lens toward the periphery of the lens.

With this structure, the astigmatism and the distortion are corrected in a balanced manner even when the power is strengthened, and also, by structuring the first lens unit L1 with a small number of lenses (two lenses), the zoom lens is made compact in its entirety. The second lens unit L2 having a positive refractive power includes a total of four lenses of, in order from the object side to the image side, a positive lens G2a having a convex surface on the object side, a cemented lens including a positive lens G2b and a negative lens G2c and a positive lens G2d having a biconvex shape. The positive lens G2a disposed on the most object side is a lens at which the on-axial ray passes highest, and is strongly related to the occurrence mainly of spherical aberration and the coma aberration.

In view of the above, in each embodiment, the positive lens G2a disposed on the most object side is structured to have the lens surface on the object side have an aspherical shape in which the positive refractive power is decreased from the center of the lens toward the periphery of the lens. Further, the lens surface on the image side also has an aspherical shape. With this structure, the spherical aberration and the coma aberration are favorably corrected. Further, the second lens unit L2 is a lens unit through which the on-axial ray passes over the entire zoom range, and hence the cemented lens in which the positive lens G2b and the negative lens G2c are cemented is provided so as to correct the axial chromatic aberration.

The cemented lens includes the positive lens and the negative lens in order from the object side to the image side so that the lens effective diameter of the second lens unit L2 is decreased, and the negative lens G2c is disposed at a position at which the beam is the lowest in height, with the result that the aberration correction is facilitated. By using a material having a high refractive index for the material of the negative lens G2c, and appropriately setting the curvature of the lens surface of the negative lens G2c, the coma flare occurring in the area from the central part of the image plane to the peripheral part of the image plane is reduced at the wide-angle end. Further, in order to decrease the exit angle of the off-axial beam to be emitted from the second lens unit L2, the positive lens G2d is disposed on the most image side among the lenses of the second lens unit L2.

The third lens unit L3 having a positive refractive power functions as a field lens for securing telecentricity on the image side, and is structured by a single positive lens G3a in order to shorten an on-axis lens thickness. The third lens unit L3 is a focus lens unit, and moves from the image side to the object side when focusing is performed from an object at infinity to a nearby object. By appropriately setting positional sensitivity during focusing, faster focusing is achieved easier. By structuring each lens unit as described above, the entire system is successfully made compact while maintaining excellent optical performance.

Hereinafter, numerical embodiments of the present invention are described. In each numerical embodiment, a surface number i indicates an order of the surface from the object side. A curvature radius of the lens surface is denoted by ri. A lens thickness and air interval between the i-th surface and the (i+1)th surface are denoted by di, and a refractive index and an Abbe number with respect to the d-line are denoted by ndi and υdi, respectively. A symbol "*" indicates an aspherical surface. In addition, two surfaces on the most image side correspond to a glass material such as a face plate. In addition, aspherical surface coefficients are denoted by k, A4, A6, A8, and A10.

As to the aspherical shape, a displacement x in the optical axis direction with respect to the surface apex at a position of height h from the optical axis is expressed by the following equation.

$$x=(h^2/R)/[1+\{1-(1+k)(h/R)^2\}^{1/2}]+A4 \cdot h^4+A6 \cdot h^6+A8 \cdot h^8+A10 \cdot h^{10}$$

where R is a paraxial curvature radius. Note that, the back focus BF is indicated as an equivalent length in air from a lens surface R15 on the most image side. In addition, a relationship between each conditional expression described above and each numerical embodiment is shown in Table 1.

Numerical Embodiment 1

Unit: mm

Surface data

| Surface Number | r | d | nd | vd |
|---|---|---|---|---|
| 1* | −164.203 | 0.90 | 1.84954 | 40.1 |
| 2* | 5.582 | 2.73 | | |
| 3 | 11.113 | 1.80 | 1.94595 | 18.0 |
| 4 | 24.304 | (Variable) | | |
| 5 (Stop) | ∞ | 0.50 | | |
| 6* | 7.522 | 2.30 | 1.69350 | 53.2 |
| 7* | 280.478 | 0.30 | | |
| 8 | 6.458 | 1.80 | 1.77250 | 49.6 |
| 9 | 20.750 | 0.50 | 2.00069 | 25.5 |
| 10 | 4.231 | 1.48 | | |
| 11 | 20.632 | 1.40 | 1.58313 | 59.5 |
| 12* | −16.480 | 0.80 | | |
| 13 Flare-cut stop | | (Variable) | | |
| 14 | 24.147 | 1.60 | 1.69680 | 55.5 |
| 15 | −39.691 | (Variable) | | |
| 16 | ∞ | 0.80 | 1.51633 | 64.1 |
| 17 | ∞ | | | |
| Image plane | ∞ | | | |

Aspherical surface data

First surface

K = 0.00000e+000   A4 = 5.99520e−005   A6 = −3.66629e−007
A8 = −2.12113e−009

Second surface

K = −1.48346e+000   A4 = 6.15668e−004   A6 = −2.64481e−006
A8 = 7.40318e−008   A10 = −1.96280e−009

Sixth surface

K = −2.92383e−001   A4 = −8.14317e−005   A6 = −4.80542e−006
A8 = 1.77053e−007

Seventh surface

K = 0.00000e+000   A4 = 8.12617e−005

Twelfth surface

K = 1.24587e+001   A4 = 1.42811e−004   A6 = −1.77519e−005
A8 = 4.55344e−007

Various data
Zoom ratio 4.22

| | Wide-angle | Intemidiate | Telephoto |
|---|---|---|---|
| Focal length | 4.36 | 9.20 | 18.38 |
| F number | 2.06 | 4.60 | 5.85 |
| Angle of half field | 37.96 | 22.84 | 11.91 |
| Image height | 3.40 | 3.88 | 3.88 |
| Total lens length | 42.45 | 37.61 | 44.20 |
| BF | 4.22 | 3.84 | 3.17 |
| d4 | 18.18 | 6.74 | 1.58 |
| d13 | 3.92 | 10.91 | 23.34 |
| d15 | 2.50 | 2.12 | 1.45 |

Zoom lens unit data

| Unit | Leading surface | Focal length |
|---|---|---|
| 1 | 1 | −10.77 |
| 2 | 5 | 11.52 |
| 3 | 14 | 21.77 |
| 4 | 16 | ∞ |

Numerical Embodiment 2

Unit: mm

Surface data

| Surface Number | r | d | nd | vd |
|---|---|---|---|---|
| 1* | −163.383 | 0.90 | 1.84954 | 40.1 |
| 2* | 5.585 | 2.74 | | |

-continued

Unit: mm

| | | | | |
|---|---|---|---|---|
| 3 | 11.017 | 1.80 | 1.94595 | 18.0 |
| 4 | 22.833 | (Variable) | | |
| 5 (Stop) | ∞ | 0.50 | | |
| 6* | 7.810 | 2.10 | 1.76802 | 49.2 |
| 7* | −1325.628 | 0.30 | | |
| 8 | 5.687 | 1.90 | 1.48749 | 70.2 |
| 9 | 16.341 | 0.50 | 2.00069 | 25.5 |
| 10 | 4.257 | 1.77 | | |
| 11 | 17.187 | 1.40 | 1.58313 | 59.5 |
| 12* | −17.186 | 0.80 | | |
| 13 Flare-cut stop | | (Variable) | | |
| 14 | 20.665 | 1.50 | 1.69680 | 55.5 |
| 15 | −63.026 | (Variable) | | |
| 16 | ∞ | 0.80 | 1.51633 | 64.1 |
| 17 | ∞ | | | |
| Image plane | ∞ | | | |

Aspherical surface data

First surface

K = 0.00000e+000   A4 = 8.85475e−005   A6 = −6.60361e−007
A8 = −3.33510e−009

Second surface

K = −1.47785e+000   A4 = 6.33705e−004   A6 = −1.12198e−006
A8 = 5.99957e−008   A10 = −2.81271e−009

Sixth surface

K = 6.54108e−002   A4 = −1.49785e−004   A6 = −4.39444e−006
A8 = 9.94717e−008

Seventh surface

K = 0.00000e+000   A4 = 9.55737e−005

Twelfth surface

K = 5.82795e+000   A4 = −7.88284e−005   A6 = −1.97276e−005
A8 = −2.56367e−008

Various data
Zoom ratio 4.22

| | Wide-angle | Intemidiate | Telephoto |
|---|---|---|---|
| Focal length | 4.36 | 9.32 | 18.37 |
| F number | 2.06 | 4.60 | 5.90 |
| Angle of half field | 37.97 | 22.58 | 11.91 |
| Image height | 3.40 | 3.88 | 3.88 |
| Total lens length | 42.79 | 38.21 | 45.73 |
| BF | 4.26 | 4.09 | 3.79 |
| d4 | 18.42 | 6.77 | 1.73 |
| d13 | 3.90 | 11.14 | 24.00 |
| d15 | 2.56 | 2.39 | 2.09 |

Zoom lens unit data

| Unit | Leading surface | Focal length |
|---|---|---|
| 1 | 1 | −10.50 |
| 2 | 5 | 11.72 |
| 3 | 14 | 22.50 |
| 4 | 16 | ∞ |

Numerical Embodiment 3

Unit: mm

Surface data

| Surface Number | r | d | nd | vd |
|---|---|---|---|---|
| 1* | −96.222 | 0.90 | 1.84954 | 40.1 |
| 2* | 5.603 | 2.50 | | |

-continued

Unit: mm

| | | | | |
|---|---|---|---|---|
| 3 | 10.905 | 1.90 | 1.92286 | 18.9 |
| 4 | 26.147 | (Variable) | | |
| 5 (Stop) | ∞ | 0.50 | | |
| 6* | 7.269 | 2.00 | 1.69350 | 53.2 |
| 7* | 4119.122 | 0.30 | | |
| 8 | 5.934 | 1.90 | 1.69680 | 55.5 |
| 9 | 15.192 | 0.50 | 2.00069 | 25.5 |
| 10 | 3.981 | 1.75 | | |
| 11 | 15.213 | 1.20 | 1.58313 | 59.5 |
| 12* | −26.324 | 0.80 | | |
| 13 Flare-cut stop | | (Variable) | | |
| 14 | 19.480 | 1.60 | 1.60311 | 60.6 |
| 15 | −43.346 | (Variable) | | |
| 16 | ∞ | 0.80 | 1.51633 | 64.1 |
| 17 | ∞ | | | |
| Image plane | ∞ | | | |

Aspherical surface data

First surface

K = 0.00000e+000   A4 = 1.20690e−004   A6 = −1.19842e−006

Second surface

K = −1.44762e+000   A4 = 6.13330e−004   A6 = 4.02272e−007
A8 = −7.28589e−009   A10 = −2.05903e−009

Sixth surface

K = −4.48656e−001   A4 = −2.52326e−005   A6 = −3.98926e−006
A8 = 2.11813e−007

Seventh surface

K = 0.00000e+000   A4 = 8.93163e−005

Twelfth surface

K = 1.36024e+001   A4 = −2.54840e−005   A6 = −2.94988e−005
A8 = 8.86614e−007

Various data
Zoom ratio 4.18

| | Wide-angle | Intemidiate | Telephoto |
|---|---|---|---|
| Focal length | 4.41 | 9.37 | 18.43 |
| F number | 2.06 | 4.60 | 5.90 |
| Angle of half field | 37.64 | 22.47 | 11.87 |
| Image height | 3.40 | 3.88 | 3.88 |
| Total lens length | 40.61 | 36.28 | 43.42 |
| BF | 4.47 | 4.31 | 4.01 |
| d4 | 17.41 | 6.35 | 1.52 |
| d13 | 2.88 | 9.78 | 22.04 |
| d15 | 2.77 | 2.61 | 2.31 |

Zoom lens unit data

| Unit | Leading surface | Focal length |
|---|---|---|
| 1 | 1 | −10.73 |
| 2 | 5 | 11.24 |
| 3 | 14 | 22.50 |
| 4 | 16 | ∞ |

TABLE 1

| Numerical Embodiment | Conditional Expression 1 (n2c × ft)/ (R2cr × Fnow) | Conditional Expression 2 n2c × ωW | Conditional Expression 3 f2c/f2d | Conditional Expression 4 (n2c × f2c)/fw | Conditional Expression 5 (n2c × f2)/ (R23r × Fnow) |
|---|---|---|---|---|---|
| 1 | 4.2 | 85.6 | −0.34 | −2.5 | 2.65 |
| 2 | 4.2 | 85.6 | −0.39 | −2.7 | 2.67 |
| 3 | 4.5 | 85.0 | −0.33 | −2.5 | 2.74 |

Hereinafter, an embodiment in which a digital still camera is used as an example of the image taking apparatus according to the present invention is described with reference to FIG. 7. In FIG. 7, the digital still camera includes a camera main body 20 and an image taking optical system 21 constituted by any one of the zoom lenses according to the present invention. The digital still camera also includes a solid-state image pickup element (photoelectric transducer element) 22 such as a CCD sensor or a CMOS sensor incorporated in the camera main body for receiving an image of a subject formed by the image taking optical system 21. The digital still camera also includes a memory 23 for recording information corresponding to the image of a subject, on which photoelectric conversion has been performed by the solid-state image pickup element 22. The digital still camera also includes a finder 24 constituted of a liquid crystal display panel or the like for observing the image of a subject formed on the solid-state image pickup element 22. In this way, according to the present invention, it is possible to provide a compact image taking apparatus having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251845, filed Nov. 10, 2010, which is hereby incorporated by reference herein in its entirety.

What is claimed is:

1. An image taking apparatus, comprising:
a zoom lens; and
a solid-state image pickup element for picking up an image formed by the zoom lens,
wherein the zoom lens comprises, in order from an object side to an image side:
a first lens unit having a negative refractive power;
a second lens unit having a positive refractive power; and
a third lens unit having a positive refractive power,
the first lens unit, the second lens unit and the third lens unit moving so as to change intervals among the first lens unit, the second lens unit and the third lens unit during zooming,
wherein the first lens unit comprises, in order from the object side to the image side:
a lens 1a having a negative power; and
a lens 1b having a positive power,
wherein the second lens unit comprises, in order from the object side to the image side:
a lens 2a having a positive power;
a cemented lens in which a lens 2b having a positive power and a lens 2c having a negative power are cemented; and
a lens 2d having a positive power, and
wherein the following conditional expressions are satisfied:

$$4.0<(n2c\times ft)/(R2cr\times Fnow)<6.0;\text{ and}$$

$$71<n2c\times\omega W<97,$$

where R2cr denotes a curvature radius of an image-side lens surface of the lens 2c, n2c denotes a refractive index of a material of the lens 2c, ft denotes a focal length of an entire system at a telephoto end, Fnow denotes an F-number at a wide-angle end, and ωW (degrees) denotes a half angle of field at the wide-angle end.

2. An image taking apparatus according to claim 1,
wherein the third lens unit comprises a lens 3a having a positive power, and
wherein the following conditional expressions are satisfied:

$$-0.5<f2c/f2d<-0.3;\text{ and}$$

$$-3<(n2c\times f2c)/fw<-2,$$

where f2c denotes a focal length of the lens 2c, f2d denotes a focal length of the lens 2d, and fw denotes a focal length of the entire system at the wide-angle end.

3. An image taking apparatus according to claim 1, wherein the following conditional expression is satisfied:

$$2.5<(n2c\times f2)/(R2cr\times Fnow)<2.8,$$

where f2 denotes a focal length of the second lens unit.

* * * * *